United States Patent
Kelly et al.

(10) Patent No.: US 7,702,518 B2
(45) Date of Patent: Apr. 20, 2010

(54) METHOD FOR ASSIGNING RETAIL UNITS TO ECONOMIC MARKETS

(75) Inventors: Thomas Kelly, Dade City, FL (US);
Nicholas M. Kiefer, Ithaca, NY (US);
Sebastián Fernández, Tampa, FL (US)

(73) Assignee: Revenue Management Solutions, Inc., Tampa, FL (US)

( * ) Notice: Subject to any disclaimer, the term of this patent is extended or adjusted under 35 U.S.C. 154(b) by 1414 days.

(21) Appl. No.: 10/887,934

(22) Filed: Jul. 12, 2004

(65) Prior Publication Data

US 2004/0243432 A1 Dec. 2, 2004

Related U.S. Application Data

(63) Continuation-in-part of application No. 10/292,533, filed on Nov. 13, 2002, now abandoned.

(60) Provisional application No. 60/331,214, filed on Nov. 13, 2001.

(51) Int. Cl.
*G06Q 10/00* (2006.01)
*G06F 17/30* (2006.01)

(52) U.S. Cl. ............................. 705/1; 705/10
(58) Field of Classification Search ..................... 705/1, 705/10
See application file for complete search history.

(56) References Cited

U.S. PATENT DOCUMENTS

| | | | |
|---|---|---|---|
| 4,930,011 A | 5/1990 | Kiewit | 358/84 |
| 5,446,919 A | 8/1995 | Wilkins | 455/6.2 |
| 5,521,813 A | 5/1996 | Fox et al. | 705/8 |
| 5,636,346 A | 6/1997 | Saxe | 395/201 |
| 5,724,521 A | 3/1998 | Dedrick | 395/226 |
| 5,848,396 A | 12/1998 | Gerace | 705/10 |
| 6,006,197 A | 12/1999 | d'Eon et al. | 705/10 |
| 6,009,409 A | 12/1999 | Adler et al. | 705/14 |
| 6,032,123 A | 2/2000 | Jameson | 705/8 |

(Continued)

FOREIGN PATENT DOCUMENTS

WO    WO02/44901 A2    6/2002

OTHER PUBLICATIONS

Avijit Ghosh and C. Samuel Craig, Fransys: A Franchise Distribution System Location Model, 1991, Journal of Retailing, vol. 67, No. 4, Winter 1991.*

(Continued)

*Primary Examiner*—Naresh Vig
(74) *Attorney, Agent, or Firm*—Baker & Hostetler LLP

(57) ABSTRACT

A method of grouping retail units of a set of units in a chain uses, store and market-specific characteristics, including store profitability, to group stores into like economic markets. The relation between profits and prices defines markets; stores facing the same relation, that is the same profit function, are in the same economic market. These stores can follow similar pricing and promotion strategies. Multiple regression analysis is used to identify those characteristics that affect the relation between prices and profits (not simply variables correlated with profits). Upon suitable standardization and weighting, these variables are subsequently used with a statistical cluster analysis to classify units in two markets. Based on the estimated relationship and homegenity valuations from discriminant analysis, new stores can be more accurately added to the appropriate group.

9 Claims, 1 Drawing Sheet

U.S. PATENT DOCUMENTS

| | | | | |
|---|---|---|---|---|
| 6,044,357 | A | 3/2000 | Garg | 705/10 |
| 6,061,660 | A | 5/2000 | Eggleston et al. | 705/14 |
| 6,223,215 | B1 | 4/2001 | Hunt et al. | 709/217 |
| 6,269,361 | B1 | 7/2001 | Davis et al. | 707/3 |
| 6,493,681 | B1 | 12/2002 | Tertitski et al. | 705/36 |
| 6,567,786 | B1 | 5/2003 | Bibelnieks et al. | 705/14 |
| 2002/0116348 | A1 | 8/2002 | Phillips et al. | 705/400 |
| 2003/0028417 | A1 | 2/2003 | Fox | 705/10 |
| 2003/0078832 | A1 | 4/2003 | Alvarez et al. | 705/10 |

OTHER PUBLICATIONS

Michael S. Morgan, Asssessing Chain-Restaurant Impact, Jun. 1995, Conrell Hotel and Restaurant Administration Quarterly, p. 30.*

The US retail demand for fish products: an application of the almost ideal demand system. Wellman, Katherine F., Applied Economics, v24, n4, p. 445(13), Apr. 1992.

Does TV advertisement really affect sales? The role of measures, models and data aggregation. Tellis, Gerald J.; Weiss, Doyle I., Journal of Advertising, v24, n3, pp. 1-12, Fall 1995.

Doyle et al., Optimal Growth Strategies for Service Organizations, The Journal of Business, vol. 56, No. 3, Jul. 1983, p. 389-405 [JSTOR].

Moutinho, et al., Comparative Computer Approaches to Multi-Outlet Retail Site Location Decisions, Service Industries Journal, vol. 13, No. 4, Oct. 1993, p. 202-220, [Diaglog: File 15].

Epstein, Site Selection Models for Retailers Not Just for Site Selection Anymore, Shopping Center Business, Jul. 1999, EIC Internet Search.

Simmons, Site Attributes in Retail Leasing: An Analysis of a Fast-food Restaurant Market, The Appraisal Journal, Oct. 1992, [Google].

Gentry, Sites Unseen, Chains Store Age, Oct. 2000, p. 154-158 [Google].

Clarke, Changing Methods of Location Planning for Retail Companies, GeoJournal, Kluwer Academic Publishers, Aug. 31, 1998, p. 289-298 [Google].

Goodchild, ILACS: A Location-Allocation Model for Retail Site Selection, Journal of Retailing, vol. 60, No. 1, Spring 1984, p. 84-100, [EBSCO].

Tayman et al., Retail Site Selection and Geographic Information Systems, Journal of Applied Business Research, vol. 11, Issue 2, Spring 1995, starting p. 46 [EBSCO].

Morgan, Assessing Chain—Restaurant Impact—Using Linear Regression, Cornell Hotel and Restaurant Administration Quarterly, Cornell University, Jun. 1995, p. 30-33 [Proquest].

Thrall et al., Retail Location Analysis with GIS: Seven Strategic Steps, Geo Info Systems, Nov. 1997, starting p. 42 [Dialog: File 16].

The Promotional Decision Process in Small Consumer-Oriented Retail and Service Firms: A Survey Analysis. Davis, Judy Foster, 1993, Michigan State University (0128).

Effective category (category management and marketing analysis) (Industry overview) (Statistical Data Included). Dhar et al., Journal of Retailing, v77, n2, p. 165, Summer 2001.

Fransys: A Franchise Distribution System Location Model, Journal of Retailing, vol. 67, No. 4, Winter 1991, Ghosh, et al.

* cited by examiner

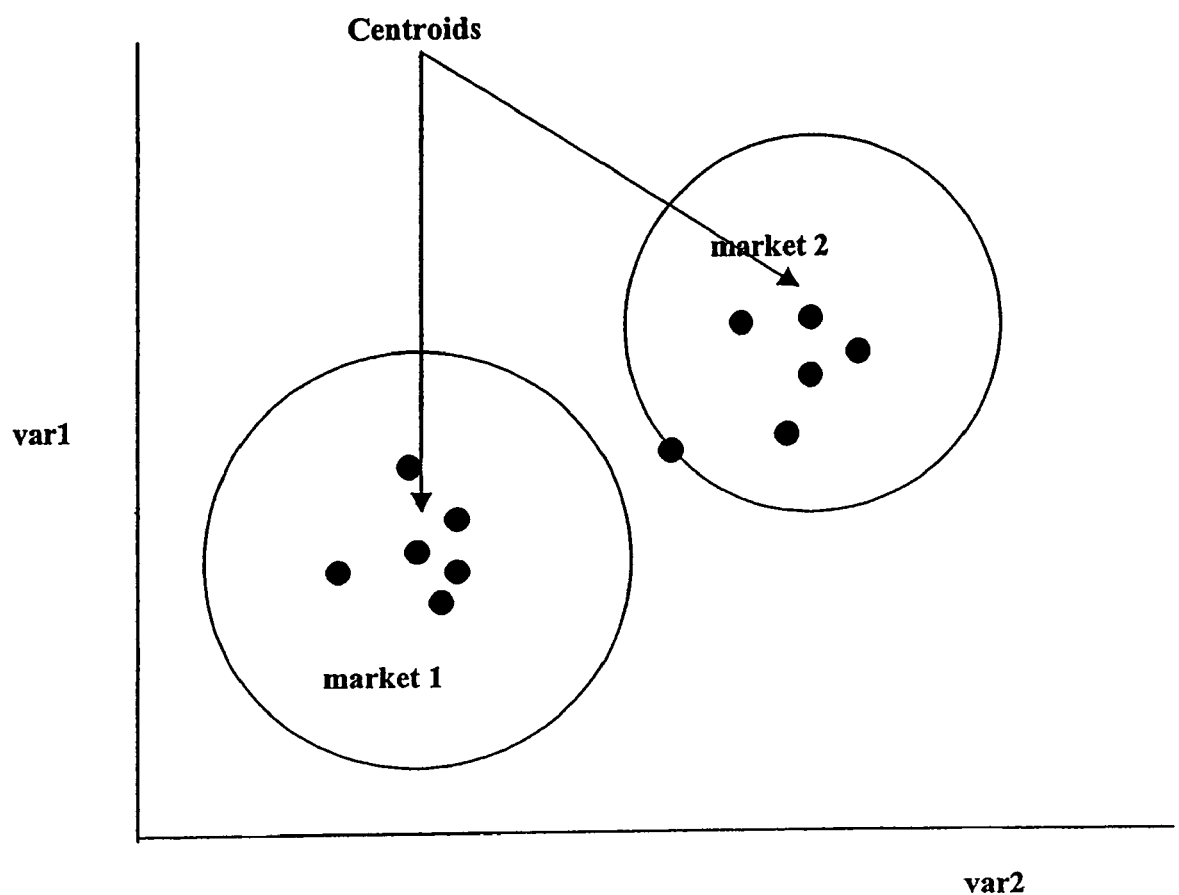

METHOD FOR ASSIGNING RETAIL UNITS TO ECONOMIC MARKETS

This application claims priority to and is a continuation-in-part of U.S. patent application Ser. No. 10/292,533, titled "Method for Assigning Retail Units to Economic Markets," filed Nov. 13, 2002 now abandoned, which claims priority under 35 U.S.C. §119(e) based on provisional Patent Application No. 60/331,214 filed on Nov. 13, 2001, the disclosures of which are hereby incorporated by reference in their entirety.

FIELD OF THE INVENTION

The present invention is directed to a method for assigning retail units to economic markets, and in particular, to a method that assigns the retail units to an economic market based on unit location, other key characteristics, and the relationship between prices and profits/sales.

BACKGROUND ART

In the prior art market segmentation studies often identify characteristics associated with profitability such as urban location, high income area, the existence of a drive through, etc. These studies then determine the effect of these variables on profits. The problem with this technique is that is fails to take into account the effect of prices on profitability.

Accordingly, a need exists to provide an improved method to group stores in common economic markets. The present invention solves this need via a method for assigning retail units to distinct economic markets by identifying observable characteristics that affect the relationship between price and profits, and for using these characteristics to group stores economically.

SUMMARY OF THE INVENTION

It is a first object of the present invention to provide an improved method to cluster stores in the same economic market for the purpose of common marketing and other strategic planning.

Another object of the invention is a method which identifies variables associated with a store that affect the relationship between prices and profits, not just profits, and not just prices.

Still another object of the invention is a method which allows a business owner to predict where a business unit will fit in established economic markets by merely using characteristics of the business unit and comparing them to characteristics of the business units in the identified economic market.

Other objects and advantages of the present. invention will become apparent as a description thereof proceeds.

This patent covers a method for classifying retail units in a chain or franchise company into distinct economic markets according to the relationship between observed store or location characteristics and the relation between prices and profits or sales. It differs from ordinary market segmentation studies that might identify characteristics associated with profitability aim (urban location, high income. area, etc) in that it is concerned with the effect of variables, not on profits directly, but on the relationship between profits and price.

What the invention does is perform a regression analysis on a database of information concerning a group of retail units or stores. The database includes variables such as urban location, high income area, rural location, drive through, no drive through, open all night, etc. Also used is a weighted fixed price index or a number of weighted fixed price indexes. The aim of the inventive method is to determine which variables affect the relationship not just on profits but the relationship between profits and prices. This tells an owner that a store with a certain characteristic has a certain price sensitivity, e.g., stores in high incomes areas are not as price sensitive as stores in lower income areas. Once the variables that affect the relationship between profits and prices are identified, then the stores having these variables or characteristics can be grouped together for common marketing strategies and the like. Thus, the stores exhibiting this characteristic and others can be grouped together as being in the same economic market.

An important aspect of the invention is to standardize the variables for the regression analysis and then weight the variables for grouping of retail units. Standardizing the variables removes the effects of scaling and variability. Weighting the variables removes the effects of certain variables with larger units being given more weight than variables with smaller units. Once the variables are standardized and the regression is performed, the variables are weighted according to regression coefficient size and clustering can be performed to group the stores having common variables.

BRIEF DESCRIPTION OF THE DRAWINGS

Reference is now made to the drawings of the invention wherein the sole FIGURE shows clustering of business units based on price and sales or profit.

DESCRIPTION OF THE PREFERRED EMBODIMENTS

The inventive method involves the identification of key variables for use in the grouping or tiering of stores and then a technique for classifying the stores into the identified groups using the key variables. The invention does this by first identifying the variables. Once the variables are identified, the stores with these variables can then be grouped together for common marketing and pricing strategies.

In conjunction with identifying key variables, another aspect of the invention is the realization that the profit function for any given store involves not only profits but also pricing policies. That is, each store has a profit function f $(p_1, \ldots, p_k)$, giving profit as a function of the price charged. These profit functions may be different for different stores, however stores in the same "economic" market (not necessarily geographic market) face the same profit functions. The optimum prices to charge depend on the profit function, and indeed are characterized by the condition $D_p f=0$, where D is the differential operator with respect to the price vector p. Thus price policies should depend on the relationship between prices and profits. The key to the inventive tiering approach is to identify observable variables, which affect the relationship between price and profits (not profits directly as done in the prior art) and then use these characteristics to group stores into distinct economic markets. Then, pricing and strategic marketing decisions can be-made for groups of stores facing homogeneous profit functions, leading to higher overall profits in the system than trying to find policies for all stores.

The first conceptual step is to focus on key prices. The tiering approach uses a fixed-weight index of prices, with either a single index value per store/period, or fixed indexes for groups of products. For example, when considering a restaurant, a single index can be used, or separate indexes for food and beverages can be used. It is important to use a fixed-weight index, instead of a check average, for example, to isolate the effects of price changes. Check averages are generally revenue divided by the quantity sold, but this variable may change even when prices do not change.

The index for the inventive method is weighted, e.g., averages of menu mixes of the unit over a relevant period (typically a year). By this procedure, the profit function is reduced to a function of a small number or price indexes, not of potentially thousands of prices for thousands of different items. This makes the problem statistically tractable. Menu mixes are preferred over check averages since check averages do not always isolate price. An example of an average menu mix for a restaurant may be 25% hamburgers, 25% cheeseburgers, and 50% chicken sandwiches sold over a given time period.

The first practical step is assembling data by store/period on the logarithm of profits and the logarithm of a price index and fixed store characteristics. The period can be day, week or month. In some cases, as mentioned above, it may be appropriate to have several price indexes, for example an overall index, then separate indexes for food and beverages.

The next step is to isolate those variables, which affect the relationship between prices and profits. This is done with a multiple regression of the log of profits on the log of the price index across all stores and periods and including interaction terms between the price index and characteristics. Here, we examine how these coefficients vary across stores according to fixed characteristics. Importantly, the characteristics should be standardized so that characteristic importance can be compared directly (i.e., independently of scale or variability). As an example, we give the proc glm code in SAS in order to hold constant the direct effects of the characteristics. Any similar regression program (these are widely available) could also be used. Below is the code for a particular case to show a specific example of the calculation in this stage of the procedure. At this point the variables var1-var9 have been standardized to mean zero and standard deviation one (these values are arbitrary but, standard: the important thing is that they are the same for each variable). In this example, these variables are digital in nature in that they are either included if one and excluded if zero. However, other variables such as continuous ones can also be employed.

```
/*************************************************************
/
proc glm
        data=storsens;
        model lnpp = lnpind
            lnpind*var1   lnpind* var2 lnpind*var3 lnpind* var4
            lnpind* var5  lnpind*var6 lnpind* var7
            lnpind* var8  lnpind* var9;
        absorb mstore;
run;
/*************************************************************
/
```

As can be seen form the example, the log of profits is regressed on the price index and the product of the log of the price index and each variable. The focus here is not on the direct effort of the measured store or market characteristics on sales or profits. Instead, the interest is in grouping stores for purposes of pricing and marketing strategies, so it is the interaction between these characteristics and the price that is important. That is, if var1 happens to affect profits directly, but not in interaction with price, that is useful information but irrelevant for pricing. It is the absorb statement that holds constant the direct effects of var1-var9 (the 9 is unimportant and the number of variables considered is the number available) and allows focus on the effects on the sensitivity. By this procedure, variables that affect the relationship between prices and profits (or sales) are isolated.

If two price indexes are used (the groups of items should be mutually exclusive and exhaustive), the regression is run at the same time. For example, if one index is related to food and the other is related to beverage, the model would regress the log of profits on the log of the price index for both food and beverage as shown below.

```
/*************************************************************
/
proc glm
        data=storsens;
        model lnpp = lnpindf
            lnpindf*var1l npindf*var2 lnpindf* var3 lnpindf* var4
            lnpindf* var5 lnpindf*var6 lnpindf* var7
            lnpindf*var8 lnpindf*var9
            lnpindb* var1 lnpindb*var2 lnpindb* var3 lnpindb* var4
            lnpindb* var5 lnpindb*var6 lnpindb* var7
            lnpindb* var8 lnpindb* var9;
        absorb mstore;
run;
/*************************************************************
/
```

Here lnpindf and lnpindb are the logs of the price indexes for food and beverages respectively.

Variables that are significant in this regression (5-statistic greater than two, but other levels could be used) have an important effect on the relation between prices and sales or profits. Thus, these variables indicate the economic market in which the unit operates. For example, suppose var1 is a zero/one variable indicating an urban location, and suppose it has a positive coefficient in interaction with lnpindf in the profits regression. This indicates that urban stores are less price-sensitive (to the price of food) than rural stores. This would lead to the probable conclusion that different pricing policies are suitable for urban and rural stores. While zero/one variables are used, continuous vales could also be employed.

After having identified the key variables with regression analysis, the next step is grouping of the stores in similar economic groupings. This allows the business owner to make business decisions for stores that are known to be similar in economic terms, and makes the decision making process simpler.

When classifying the stores, it is preferred not to use raw values because variables measured in larger units would be given much larger weights than those in smaller units. The solution to this problem is the use of weighting. The weighting is derived from the regression coefficients. The magnitude of the estimated values of the coefficients determines the weighting. That is, variables that are more influential in determining the relationship between price and profits have more weight in sorting units into economic markets. Of course, other weightings could be used as would be within the skill of the artisan.

With the weighted variables, the classifying of stores can be done using conventional statistical clustering techniques or analysis. Clustering involves organizing observed data in meaningful structures and is a well known technique that does not require a full description for understanding of the invention.

We add clusters as long as the groups of stores are well-defined. As the number of clusters increases; smaller clusters, less well-distinguished, will appear. An example of SAS code for this is given here (in this example the variables vary and var7 were dropped—insignificant in the previous regressions):

```
/*******************************************************
*********/
proc fastclus data=tgifstan out=out maxc=7;
    var var1 var2 var3 var4 var6 var8 var9;
run;
/*******************************************************
*********/
```

The number of economic markets identified depends on the data. The statistical clustering algorithm provides a grouping of the units under analysis into clusters on the basis of the characteristics found to be important in determining the relationship between prices and profits (or sales). See the sole figure. Once these groups have been identified, other analyses can be done within groups, where the stores are fairly homogeneous, to determine pricing and strategic marketing policies.

For example, after the clusters are defined, the accuracy of the clusters can be checked using any one of conventional or non-conventional statistical discriminant analysis schemes. Traditionally, discriminant analysis involves using a set of variables to describe predetermined groups through functions and then calculating scores for each observation to reassign these scores to one of the predetermined groups. An example of programming variables and groupings that may be used in a discriminant coding implementation is given here:

```
/*******************************************************
*************/
proc discrim data=sasuser.discrim out=out method=normal list posterr
crosslist;
class cluster;
id store;
priors proportional;
var
Traditional
Play_Indoor
RLoc_B
VillasMiddleIncome
Comp_1Km
Comp_5Km
Ownership
Age
CompN_TotalComp
QSC
SENSTR
SENSGP
PINDEX;
run;
/*******************************************************
*************/
```

Many approaches to the use of discriminant analysis are available and are well known in the art, therefore, they are not discussed in further detail herein.

Alternatively or cooperatively with discriminant analysis, factorial analysis can be applied to yield information about the respective groups or clusters, for example. Factorial analysis, in general, consists of summarizing the largest amount of information possible in a reduced number of variables. For example the variance of 30 variables may be explained almost fully by 4 factors that are a combination of these variables. Factorial analysis is commonly used for scale variables while correspondence analysis involves applying the same basic concept to binary variables. One such example of programming variables with factorial relevant assignments is shown below:

```
/***************************************************
*****/proc factor data=Tier method=principal msa scree preplot score
    nfactors=3 Rotate=varimax reorder plot outstat=fac5;
        var totcsale ncom1m nbur1m ncom2m nbur2m
    msclean msfast msfriend msfood
    kidfam pershh owndw rentdw detach apartm age1 age2 age3
    single married divorc educ2 educ3 educ4 totpop daypop employ
    presanix grprosen kvtrfsen deseix;
run;
proc print data=fac5;
run;
proc score data=Tier score=fac5 out=scor_all;
run;
    /***************************************************
*****/
```

Factorial analysis, like discriminant analysis, as well as correspondence analysis, are well known techniques to one of ordinary skill in the art and, therefore, they are not discussed in further detail herein.

Based on the application of additional analysis, such as described above, extra degrees of intelligence and predictability can be acquired. For example, accuracy of the initial cluster classifications and groupings can be verified. Further, error rates from prior-analyzed groupings, stores, etc. can be correlated or evaluated with respect to new groupings, stores, etc. that share similar characteristics. Thus, a general cross pollination of information to new groupings, stores, etc. and/or feedback can be devised, resulting in the development of common policies that are appropriate within economic markets, rather than simply across markets.

The invention can also be applied to new or unsampled stores. These additional units, either not included in the sample or potential new units, can be classified into one of the economic groups on the basis of the new group's observable characteristics without any new estimation. The first step is to look at the characteristics of the new unit (appropriately standardized and weighted). Then, look at the characteristics of the centroids of the existing classes, and put the new unit in the group with the closest centroid. The sole figure below shows the outcome of the method wherein twelve stores are classified into two groups, with the centroid being identified as well.

As noted above, once the stores are grouped economically, an owner can then look at marketing and pricing strategies based on the economic unit; and apply the strategies to all stores in the group knowing that the strategies should work in each store since each store is part of the same economic group.

As such, an invention has been disclosed in terms of preferred embodiments thereof which fulfills each and every one of the objects of the present invention as set forth above and provides a new and improved method for assigning retail units to economic markets.

Of course, various changes, modifications and alterations from the teachings of the present invention may be contemplated by those skilled in the art without departing from the intended spirit and scope thereof. It is intended that the present invention only be limited by the terms of the appended claims.

What is claimed is:

1. A method performed by an electronic data machine for grouping together one or more retail units of a first set of retail units based on common economics, said method comprising:
   a) collecting at least one fixed price index for each retail unit over a select period of time;
   b) identifying a number of variables associated with each retail unit, each variable having a standardized value;
   c) regressing profits against the price index and the product of the price index and the identified variables, and generating a regression coefficient for each of the identified variables;
   d) identifying which variables have more significant regression coefficients, and grouping retail units having these characteristics together as being in a common economic market;
   e) assigning said one or more retail units in groups with less than a set number of retail units to another existing group that exhibits the closest set of characteristics, thereby reducing the number of retail unit groupings;
   f) describing the different groupings using any one or more of discriminant analysis, factorial analysis, correspondence analysis, and using the description results to validate the grouping assignments; and
   g) assigning new retail units to at least one corresponding group.

2. The method of claim 1, wherein the fixed price index is based on entire menu mix of the retail unit.

3. The method of claim 1, wherein a number of fixed price indexes are employed, each fixed price index based on a type of product of the retail unit.

4. The method of claim 1, wherein the standardized variables are weighted according to the magnitude of their respective coefficients and the retail units are grouped using the weighted variables.

5. The method of claim 4, applying the same marketing and pricing policies to the retail units grouped together by significant variables.

6. The method of claim 4, further comprising applying the same marketing and pricing policies to the retail store units grouped together by significant variables.

7. The method of claim 1, wherein variables of a second set of retail units are compared to variables identified in the economic market, grouping retail units in the second set that have variables that approximate or match variables of a centroid retail unit of the first set.

8. The method of claim 1, wherein the variable uses are combined using factorial and correspondence analysis and the fixed price index is based on an entire menu mix of the retail store unit.

9. The method of claim 1, wherein new retail units are analyzed and assigned to a corresponding group.

* * * * *